(12) United States Patent
Yamamoto et al.

(10) Patent No.: US 9,174,666 B2
(45) Date of Patent: Nov. 3, 2015

(54) RACK SHAFT SUPPORT DEVICE AND STEERING SYSTEM INCLUDING RACK SHAFT SUPPORT DEVICE

(71) Applicant: JTEKT CORPORATION, Osaka-shi, Osaka (JP)

(72) Inventors: Taichi Yamamoto, Kashihara (JP); Tetsuya Fujita, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 207 days.

(21) Appl. No.: 13/903,244

(22) Filed: May 28, 2013

(65) Prior Publication Data

US 2013/0319141 A1 Dec. 5, 2013

(30) Foreign Application Priority Data

May 30, 2012 (JP) ................................. 2012-123609
May 30, 2012 (JP) ................................. 2012-123610

(51) Int. Cl.
*B62D 3/12* (2006.01)
*F16H 19/04* (2006.01)
*F16H 55/28* (2006.01)

(52) U.S. Cl.
CPC ................ *B62D 3/123* (2013.01); *F16H 19/04* (2013.01); *F16H 55/283* (2013.01); *Y10T 74/18096* (2015.01)

(58) Field of Classification Search
CPC ......... B62D 3/123; B62D 3/12; F16H 55/283
USPC ........... 74/422, 409, 29, 89.17; 180/428, 427; 280/93.514
See application file for complete search history.

(56) References Cited

U.S. PATENT DOCUMENTS

| 7,487,984 | B1 | 2/2009 | Lemont, Jr. et al. |
| 2009/0223314 | A1 | 9/2009 | Eickholt |
| 2010/0024583 | A1* | 2/2010 | Kawakubo et al. ............. 74/422 |
| 2010/0122595 | A1 | 5/2010 | Sung et al. |

FOREIGN PATENT DOCUMENTS

| EP | 2 098 435 A2 | 9/2009 |
| JP | A-2010-36610 | 2/2010 |
| JP | A-2010-64519 | 3/2010 |

OTHER PUBLICATIONS

Apr. 23, 2014 Extended European Search Report issued in European Patent Application No. 13169620.5.

* cited by examiner

*Primary Examiner* — Keith Frisby
(74) *Attorney, Agent, or Firm* — Oliff PLC

(57) ABSTRACT

A rack shaft support device includes: a support yoke, a plug, an intermediate cam component and a rotation force generating spring. The plug includes a plug body, a plug cap component and a locknut. The plug body has a plug fixing portion, a plug back wall portion, a plug cam portion, a plug internal space and a first restricting portion. The first restricting portion has a first body portion and a first facing portion. The intermediate cam component includes an intermediate cam body, an intermediate cam portion and a second restricting portion. The second restricting portion has a second body portion and a second facing portion. The second facing portion faces the first facing portion.

7 Claims, 7 Drawing Sheets

ND SHAFT SUPPORT DEVICE AND
RACK SHAFT SUPPORT DEVICE AND STEERING SYSTEM INCLUDING RACK SHAFT SUPPORT DEVICE

INCORPORATION BY REFERENCE

The disclosure of Japanese Patent Application No. 2012-123609 and 2012-123610 filed on May 30, 2012 and May 30, 2012 including the specification, drawings and abstract is incorporated herein by reference in its entirety.

BACKGROUND OF THE INVENTION

1. Field of the Invention

The invention relates to a rack shaft support device that supports a rack shaft with the use of a support yoke, and a steering system including the rack shaft support device.

2. Description of Related Art

The configuration of a steering system described in Japanese Patent Application Publication No. 2010-36610 (JP 2010-36610 A) will be described with reference to FIG. 9. The steering system 400 includes a rack housing 410, a rack shaft 420, a pinion shaft 430 and a rack shaft support device 440. The rack shaft support device 440 includes a support yoke 450, a plug 460, an intermediate cam component 470, a rotation force generating spring 480 and an adjusting bolt 490.

The plug 460 has a plug fixing portion 461, a plug internal space 462 and a cam face 463. The plug fixing portion 461 of the plug 460 is fixed to the rack housing 410. The plug internal space 462 of the plug 460 accommodates part of the adjusting bolt 490, the rotation force generating spring 480 and part of the intermediate can component 470.

The intermediate cam component 470 has a spring retaining portion 471, a restricting portion 472 and a cam face 473. The cam face 473 of the intermediate cam component 470 contacts the cam face 463 of the plug 460.

The restricting portion 472 functions as a guide at the time when the plug 460 and the intermediate cam component 470 are assembled to each other and functions to restrict relative radial movement of the mutually assembled plug 460 and intermediate cam component 470. The restricting portion 472 has a first restricting portion 472A arranged inside the plug fixing portion 461 and a second restricting portion 472B arranged outside the plug fixing portion 461. The restricting portion 472 restricts radial movement of the intermediate cam component 470 with respect to the plug 460 by the contact of the outer face of the first restricting portion 472A with the inner face of the plug fixing portion 461.

The spring retaining portion 471 retains the rotation force generating spring 480. The spring retaining portion 471 is formed at a plug 460-side end portion of the first restricting portion 472A. The spring retaining portion 471 has two columnar portions extending toward the plug 460 and a groove formed between the two columnar portions.

The rotation force generating spring 480 has a first spring end portion 481, a second spring end portion 482 and a spring winding portion 483. The first spring end portion 481 is connected to a spring retaining portion 491 of the adjusting bolt 490. The second spring end portion 482 is connected to the groove of the spring retaining portion 471 of the intermediate cam component 470. The rotation force generating spring 480 applies force to the intermediate cam component 470 to cause the intermediate cam component 470 to rotate with respect to the plug 460.

The rack shaft support device 440 has such a configuration that an intermediate cam component 470-side portion of the plug internal space 462 is filled with the first restricting portion 472A. Therefore, the rotation force generating spring 480 is required to be arranged on the plug 460 side in accordance with the size of the first restricting portion 472A in a pressing direction. Therefore, there is a possibility that the plug internal space 462 needs to be increased. In addition, the rack shaft support device 440 has the adjusting bolt 490, so it is difficult to reduce the size in the pressing direction.

SUMMARY OF THE INVENTION

The invention provides a rack shaft support device having a configuration that allows a reduction in size in a pressing direction and a steering system including the rack shaft support device.

A first aspect of the invention provides a rack shaft support device. The rack shaft support device includes a support yoke, a plug, an intermediate cam component and a rotation force generating spring. The support yoke is arranged in an accommodating portion of a rack housing for accommodating a rack shaft, and moves the rack shaft in a pressing direction toward the pinion shaft in the accommodating portion. The plug has a plug fixing portion, a plug cam portion, a plug back wall portion and a first restricting portion. The plug fixing portion is arranged across the support yoke from the rack shaft in the accommodating portion, and is fixed to the rack housing. The plug cam portion is arranged closer to the support yoke than the plug fixing portion, and has a first cam face. The plug back wall portion is formed across the plug fixing portion from the support yoke. The first restricting portion protrudes from the plug back wall portion toward the support yoke. The intermediate cam component has an intermediate cam body, an intermediate cam portion and a second restricting portion. The intermediate cam body is arranged closer to the support yoke than the plug in the accommodating portion, and has an axis extending in the pressing direction. The intermediate cam portion is formed around the intermediate cam body, and has a second cam face that contacts the first cam face. The second restricting portion protrudes from the intermediate cam body toward the plug, and faces the first restricting portion in a direction that intersects with the axis of the intermediate cam body. The rotation force generating spring is connected to the plug, and applies force to the intermediate cam component to cause the intermediate cam component to rotate with respect to the plug.

With the above configuration, the first restricting portion and the second restricting portion face each other. Therefore, relative movement of the plug and the intermediate cam component in the direction that intersects with the axis of the intermediate cam body is restricted by mutual contact of the first restricting portion and the second restricting portion. That is, the first restricting portion and the second restricting portion position the plug and the intermediate cam component in the direction that intersects with the axis of the intermediate cam body.

In addition, with the above configuration, each of the first restricting portion and the second restricting portion that position the plug and the intermediate cam component has a shape such that each of the first restricting portion and the second restricting portion protrudes from the plug back wall portion or the intermediate cam body toward a space inside the plug. Therefore, it is possible to form an overlapped portion at which the rotation force generating spring overlaps with the first restricting portion and the second restricting portion in the axial direction of the intermediate cam body. Therefore, in the portion for positioning the plug and the intermediate cam component, it is possible to reduce the size of the rack shaft support device in the pressing direction in comparison with the case where the intermediate cam component-side portion of the plug internal space is filled.

In the above-described rack shaft support device, the rotation force generating spring may have a coil-shaped spring winding portion, and the first restricting portion and the second restricting portion may be inserted in a radially inner side of the spring winding portion.

With the above rack shaft support device, in comparison with the case where the first restricting portion and the second restricting portion are arranged not in the space inside the spring winding portion in the axial direction of the rotation force generating spring but are arranged outside the space, the overlapped portion of the components in the pressing direction of the rack shaft support device increases. Therefore, it is possible to reduce the size of the rack shaft support device in the pressing direction.

In the above-described rack shaft support device, the rotation force generating spring may have a first spring end portion and a second spring end portion, the first restricting portion may have a first body portion that retains the first spring end portion and a first facing portion that faces the second restricting portion in the direction that intersects with the axis of the intermediate cam body, and the second restricting portion may have a second body portion that retains the second spring end portion and a second facing portion that faces the first facing portion in the direction that intersects with the axis of the intermediate cam body.

With the above configuration, the first restricting portion and the second restricting portion have the function of positioning the plug and the intermediate cam component in the direction that intersects with the axis of the intermediate cam body and the function of retaining the rotation force generating spring. Therefore, in comparison with the case where a portion having the function of positioning the plug and the intermediate cam component and a portion having the function of retaining the rotation force generating spring are individually formed, the configuration of the rack shaft support device is simplified.

In the above-described rack shaft support device, the second restricting portion may face the first restricting portion via a clearance in the direction that intersects with the axis of the intermediate cam body.

With the above configuration, in comparison with the case where no clearance is formed between the first restricting portion and the second restricting portion, rotation resistance reduces at the time when the intermediate cam component rotates with respect to the plug. Therefore, even when the spring force of the rotation force generating spring is reduced, it is possible to rotate the intermediate cam component.

In the above-described rack shaft support device, the support yoke may include a yoke back face portion formed at a portion across from the rack shaft, a yoke hole portion being open at the yoke back face portion. The intermediate cam component may include a cam protruding portion that protrudes from the intermediate cam body toward the yoke back face portion and that is inserted in the yoke hole portion.

With the above configuration, in the process of adjusting the spring force of the rotation force generating spring connected to the plug and the intermediate cam component, it is possible to fit a tool to the cam protruding portion. Then, by rotating the intermediate cam component with respect to the plug with the use of the tool, it is possible to adjust the spring force of the rotation force generating spring. Therefore, it is possible to omit an adjusting bolt from the rack shaft support device. Therefore, it is possible to reduce the size of the rack shaft support device in the pressing direction.

In addition, with the above configuration, in comparison with the case where the cam protruding portion is arranged outside the support yoke in the axial direction of the intermediate cam component, it is possible to reduce the size of the rack shaft support device in the pressing direction.

In the above-described rack shaft support device, the cam protruding portion may have a tool corresponding portion having a shape corresponding to a tool for rotating the intermediate cam component with respect to the plug.

With the above configuration, in the process of adjusting the spring force of the rotation force generating spring connected to the plug and the intermediate cam component, it is possible to fit a tool, corresponding to the tool corresponding portion, to the cam protruding portion. Then, by rotating the intermediate cam component with respect to the plug with the use of the tool, it is possible to adjust the spring force of the rotation force generating spring. Therefore, in comparison with the case where the tool corresponding portion is not formed in the cam protruding portion, workability of work for rotating the intermediate cam component with respect to the plug improves.

In the above-described rack shaft support device, the tool corresponding portion may have a hexagon socket corresponding to a hexagonal wrench key.

In the above-described rack shaft support device, the tool corresponding portion may have a polygonal outer shape corresponding to a wrench.

A second aspect of the invention provides a steering system. The steering system includes: the rack housing; the rack shaft; the pinion shaft; and the rack shaft support device having at least one of the above-described configurations.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
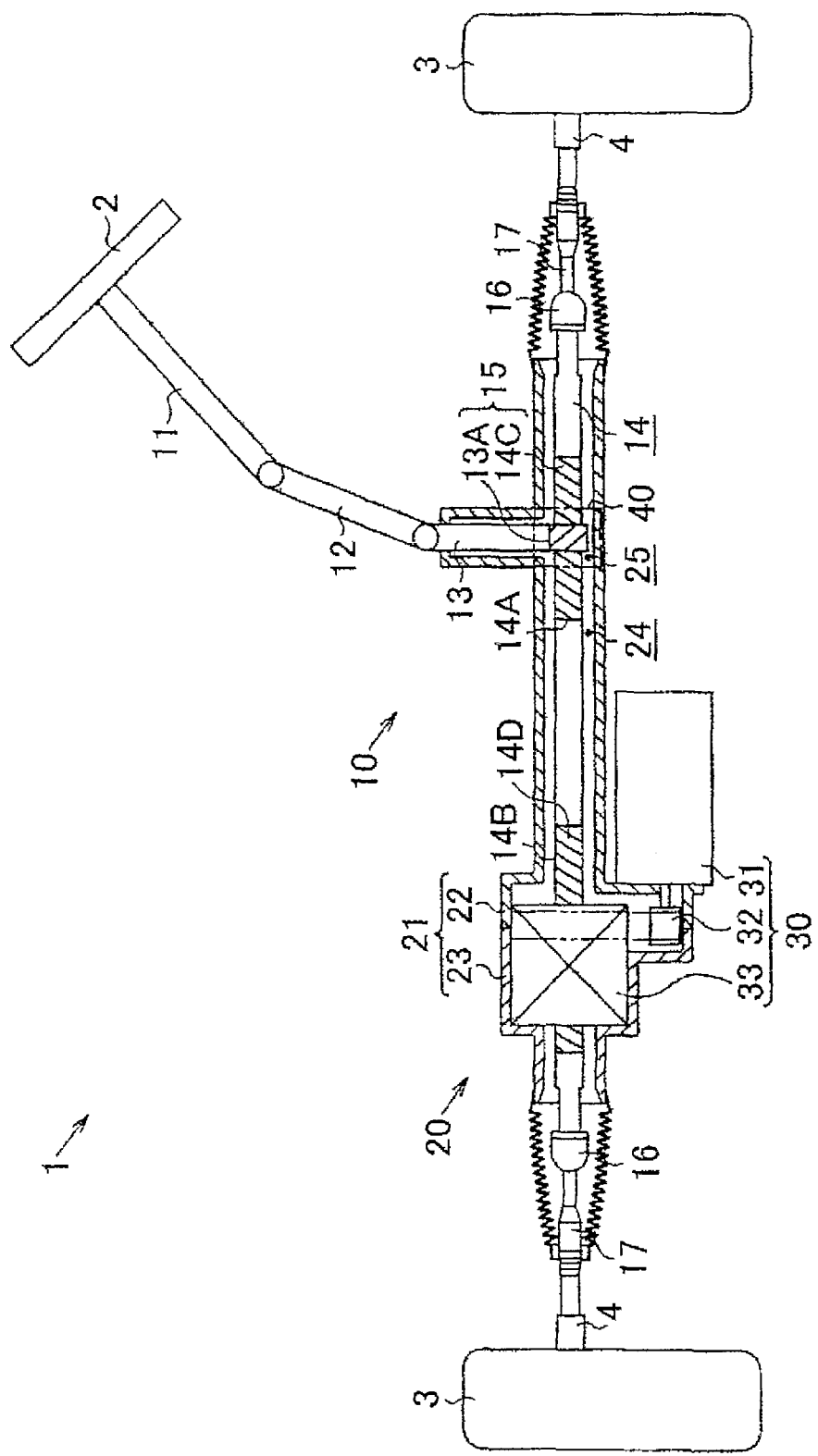
FIG. 1 is a configuration view that shows a steering system according to an embodiment.

The configuration of a steering system 1 will be described with reference to FIG. 1. The steering system 1 includes a steering system body 10, a shaft accommodating device 20, an assist device 30 and a rack shaft support device 40. The steering system 1 is configured as a rack-parallel-type electric power steering system that assists operation of a steering wheel 2 with the use of the assist device 30.

The steering system body 10 includes a column shaft 11, an intermediate shaft 12, a pinion shaft 13, a rack shaft 14, a rack-and-pinion mechanism 15, two ball joints 16 and two tie rods 17. The steering system body 10 integrally rotates the column shaft 11, the intermediate shaft 12 and the pinion shaft 13 with the rotation of the steering wheel 2. The steering system body 10 translates the rack shaft 14 in the longitudinal direction with the rotation of the pinion shaft 13. The steering system body 10 changes the steered angle of steered wheels 3 via knuckles 4 by translating the rack shaft 14.

The rack shaft 14 has a geared portion 14A and a threaded portion 14B. The rack shaft 14 has a rack gear 14C at the geared portion 14A over a predetermined range in the longitudinal direction. The rack shaft 14 has an external screw thread as a rack screw thread 14D over a predetermined range in the longitudinal direction at the threaded portion 14B. The rack shaft 14 has a cross-sectional shape similar to a D shape in a cross section perpendicular to the longitudinal direction.

The rack-and-pinion mechanism 15 is formed of a pinion gear 13A of the pinion shaft 13 and the rack gear 14C of the rack shaft 14. The rack-and-pinion mechanism 15 converts the rotation of the pinion shaft 13 to the translation of the rack shaft 14.

The shaft accommodating device 20 (see FIG. 2) includes a rack housing 21, an oil seal 26, a ball bearing 27 and a needle bearing 28. The shaft accommodating device 20 is formed as an assembly of the rack housing 21, the oil seal 26, the ball bearing 27 and the needle bearing 28 that are respectively formed as individual components.

The rack housing 21 is formed of a metal material. The rack housing 21 has a cylindrical shape corresponding to the shape of the rack shaft 14. The rack housing 21 has a base housing 22, an end housing 23, a base accommodating space 24 and a support accommodating space (that is, "accommodating portion" in the claims 25. The rack housing 21 has such a configuration that the base housing 22 and the end housing 23 that are respectively formed as individual components are connected to each other. The base accommodating space 24 of the rack housing 21 accommodates the pinion shaft 13, the rack shaft 14, the ball joints 16, a speed reduction device 32 and a ball screw device 33. The speed reduction device 32 and the ball screw device 33 constitute the assist device 30. The support accommodating space 25 of the rack housing 21 accommodates the rack shaft support device 40.

The assist device 30 includes an electric motor 31, the speed reduction device 32 and the ball screw device 33. The assist device 30 rotates the ball screw device 33 by transmitting the rotation of the electric motor 31 to the ball screw device 33 with the use of the speed reduction device 32. Thus, the assist device 30 applies force to the rack shaft 14. The force acts in the longitudinal direction of the rack shaft 14.

Figure 2:
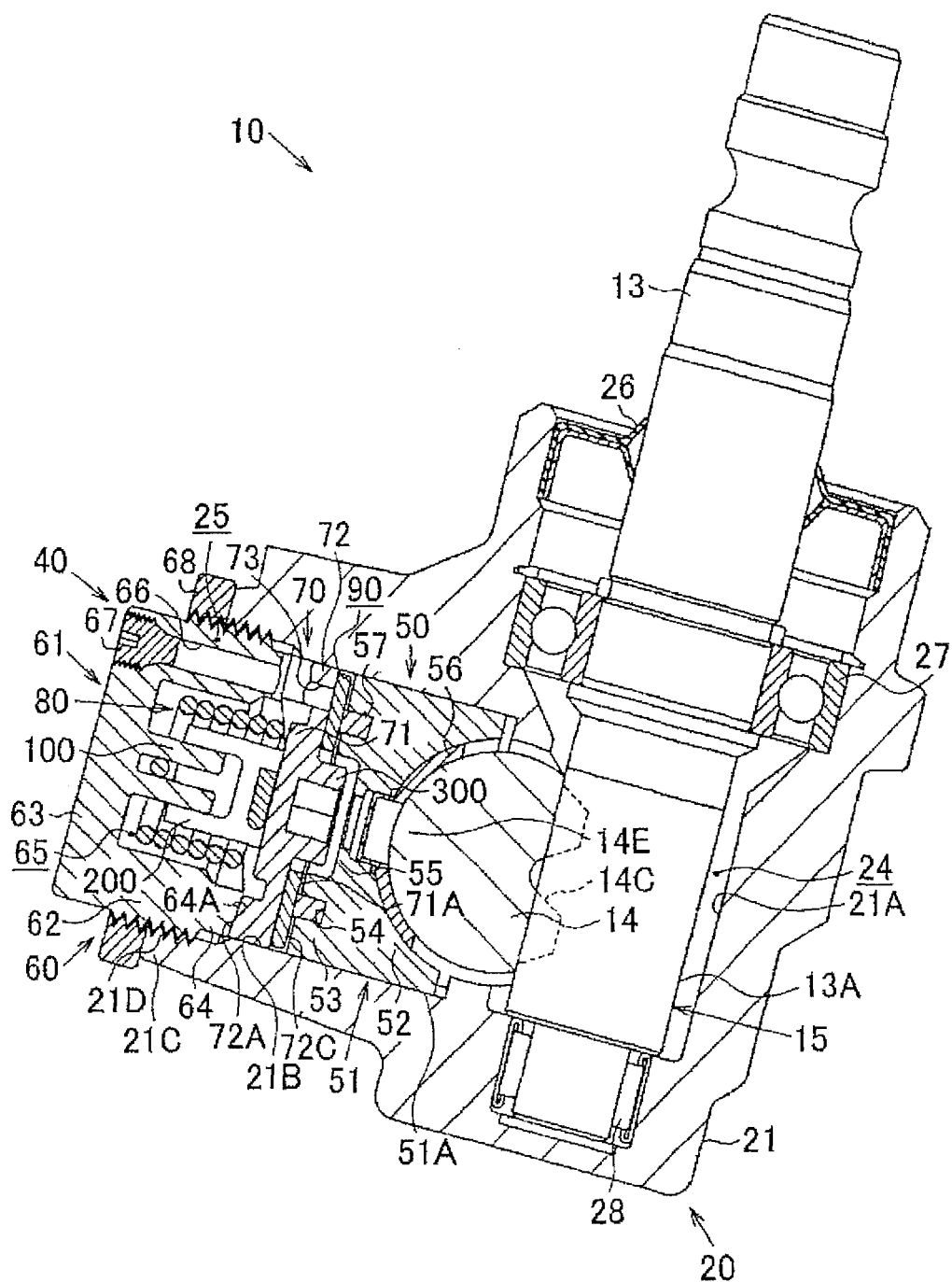
FIG. 2 is a cross-sectional view of a rack shaft support device according to the embodiment and is a cross-sectional view that shows the cross-sectional structure of the rack shaft support device and its surrounding portion.

The configuration around the rack-and-pinion mechanism 15 will be described with reference to FIG. 2. A base portion inner face 21A of the rack housing 21 defines the base accommodating space 24. A support portion inner face 21B of the rack housing 21 defines the support accommodating space 25. A support opening portion 21C of the rack housing 21 opens the support accommodating space 25 toward the outside. The support portion inner face 21B of the rack housing 21 has an opening portion internal screw thread 21D at the support opening portion 21C. The base accommodating space 24 of the rack housing 21 accommodates the pinion gear 13A of the pinion shaft 13, the rack gear 14C of the rack shaft 14, the oil seal 26, the ball bearing 27 and the needle bearing 28.

The rack shaft support device 40 includes a support yoke 50, a plug 60, an intermediate cam component 70, a rotation force generating spring 80 and an intermediate ring 90. The rack shaft support device 40 is formed as an assembly of the support yoke 50, the plug 60, the intermediate cam component 70, the rotation force generating spring 80 and the intermediate ring 90 that are respectively formed as individual components. In the rack shaft support device 40, the support yoke 50, the plug 60, the intermediate cam component 70, the rotation force generating spring 80 and the intermediate ring 90 have the same axis. In the rack shaft support device 40, the support yoke 50 is pressed against a rack back face portion 14E of the rack shaft 14 with the use of the plug 60, the intermediate cam component 70 and the rotation force generating spring 80.

Figure 3:
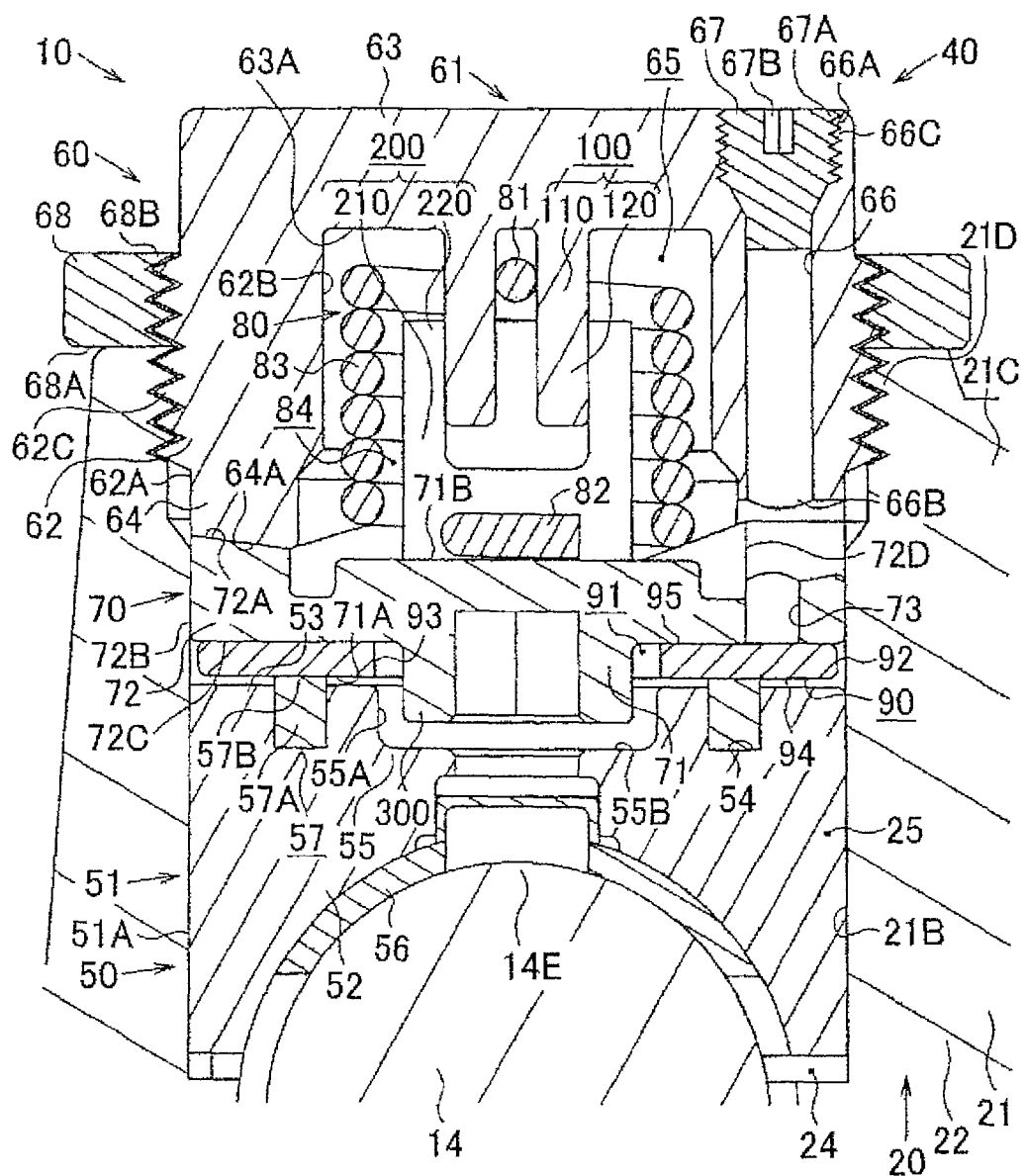
FIG. 3 is a cross-sectional view of the rack shaft support device according to the embodiment and is a cross-sectional view that shows the enlarged structure of the rack shaft support device and its surrounding portion shown in FIG. 2.

The configuration of the rack shaft support device 40 will be described with reference to FIG. 3. A pressing direction indicates a direction in which the rack shaft 14 is pressed against the pinion shaft 13 (see FIG. 2) in the support accommodating space 25. In addition, a separating direction indicates a direction in which the rack shaft 14 is separated from the pinion shaft 13 (see FIG. 2) in the support accommodating space 25.

The support yoke 50 is arranged on the back face side of the rack shaft 14 in the support accommodating space 25. The support yoke 50 is movable in the pressing direction and in the separating direction inside the support accommodating space 25. The support yoke 50 has a yoke body 51, a low friction sheet 56 and a resin elastic component 57. The support yoke 50 has such a configuration that the yoke body 51, the low friction sheet 56 and the resin elastic component 57 that are respectively formed as individual components are connected to each other.

The yoke body 51 is formed of a metal material. The yoke body 51 has such a shape that a circular columnar component is partially cut away. A body outer face 51A of the yoke body 51 is supported by the support portion inner face 21B of the rack housing 21. The yoke body 51 has a yoke support portion 52 and a yoke back face portion 53.

The yoke support portion 52 is formed at a rack shaft 14-side portion of the yoke body 51. The yoke support portion 52 has a shape corresponding to the rack back face portion 14E of the rack shaft 14. The yoke support portion 52 supports the rack back face portion 14E via the low friction sheet 56.

The yoke back face portion 53 has a circular columnar shape having a recess. The yoke back face portion 53 is formed at a plug 60-side portion of the yoke body 51. The yoke back face portion 53 has a yoke back face groove 54 and a yoke hole portion 55. The yoke back face portion 53 faces a ring front face 94 of the intermediate ring 90 via a clearance.

The resin elastic component 57 has a resin accommodating portion 57A and a resin protruding portion 57B. In the resin elastic component 57, the resin accommodating portion 57A is fitted to the yoke back face groove 54. In the resin elastic component 57, the resin protruding portion 57B protrudes from the yoke back face groove 54 and contacts the ring front face 94. When the resin protruding portion 57B is pressed against the ring front face 94, the resin elastic component 57 is compressed by the yoke body 51 and the intermediate ring 90. The resin elastic component 57 presses the intermediate ring 90 against the intermediate cam component 70 with restoring force that is generated as a result of compression deformation.

The intermediate ring 90 is formed of a metal material having a small friction coefficient. The intermediate ring 90 is arranged between the support yoke 50 and the intermediate cam component 70. The intermediate ring 90 has a ring through-hole 91. A ring outer face 92 of the intermediate ring 90 faces the support portion inner face 21B of the rack housing 21 via a clearance. A ring inner face 93 of the intermediate ring 90 faces a protruding portion outer face 311 of the intermediate cam component 70 via a clearance. A ring back face 95 of the intermediate ring 90 contacts a cam body front face 71A of an intermediate cam body 71 and a cam portion front face 72C of an intermediate cam portion 72.

A helical torsion spring that serves as the rotation force generating spring 80 is formed of a metal material. The rotation force generating spring 80 has a first spring end portion 81, a second spring end portion 82 and a spring winding portion 83. The rotation force generating spring 80 has such a configuration that the first spring end portion 81, the second spring end portion 82 and the spring winding portion 83 are integrally formed of the same metal material. In the rotation force generating spring 80, the first spring end portion 81 is connected to a plug body 61. In the rotation force generating spring 80, the second spring end portion 82 is connected to the intermediate cam component 70. The rotation force generating spring 80 applies force to the intermediate cam component 70 to cause the intermediate cam component 70 to rotate with respect to the plug 60.

The plug 60 is arranged across the support yoke 50 from the rack shaft 14 in the support accommodating space 25. The plug 60 includes the plug body 61, a plug cap component 67 and a locknut 68. The plug 60 has such a configuration that the plug body 61, the plug cap component 67 and the locknut 68 that are respectively formed as individual components are connected to each other. In the plug 60, the plug body 61 and the locknut 68 have the same axis. The plug 60 retains the rotation force generating spring 80. The plug 60 closes the support opening portion 21C of the rack housing 21.

The locknut 68 is formed of a metal material. The locknut 68 has a nut end face 68A and a nut internal screw thread 68B. The nut internal screw thread 68B of the locknut 68 is screwed to a plug external screw thread 62C of the plug body 61. The nut end face 68A of the locknut 68 contacts the end face of the support opening portion 21C. The locknut 68 inhibits looseness of the plug body 61 with respect to the rack housing 21.

Figure 4:
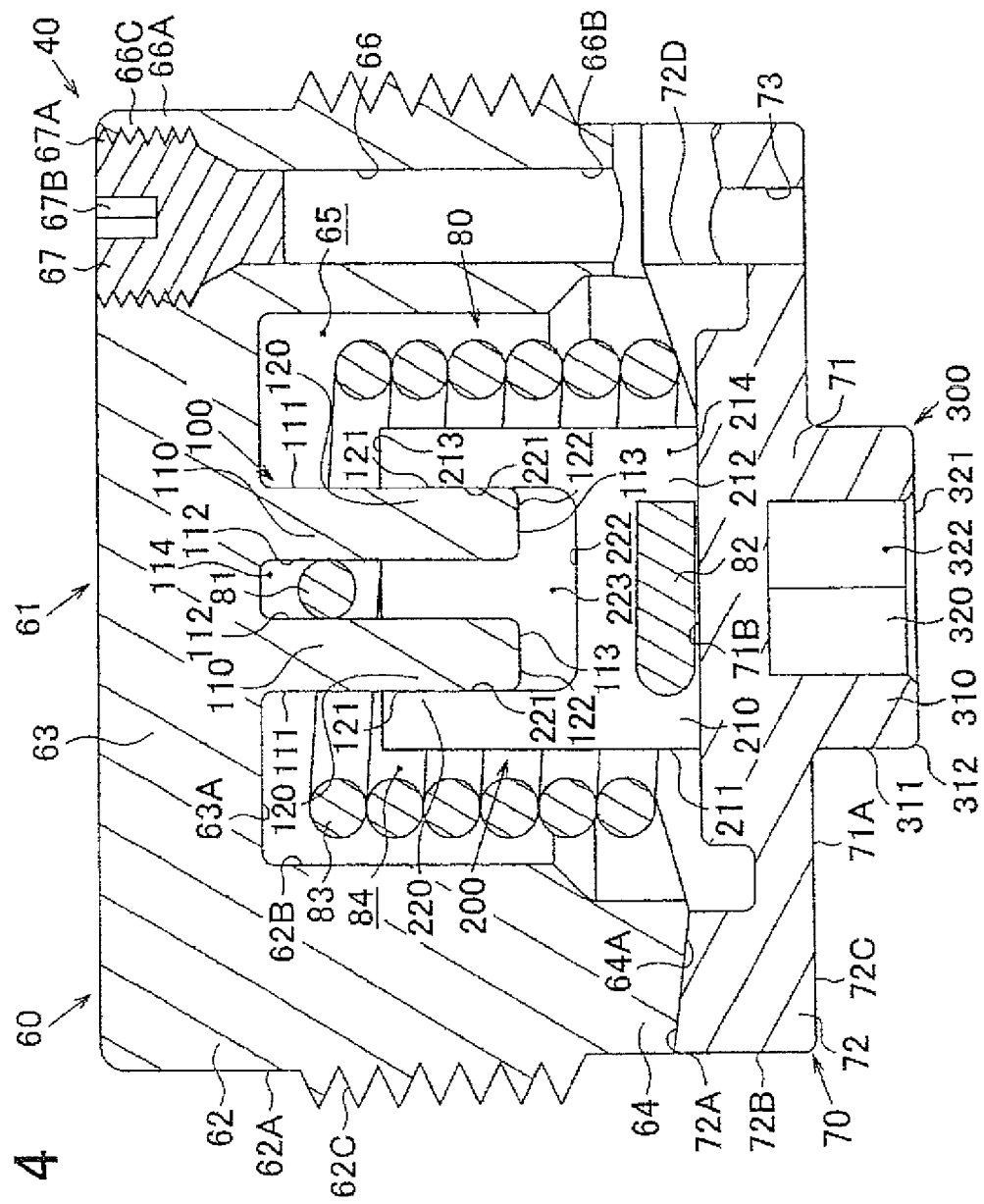
FIG. 4 is a cross-sectional view of the rack shaft support device according to the embodiment and is a cross-sectional view that shows the enlarged structure of a plug body, an intermediate cam component and a rotation force generating spring.

The configuration of the plug 60 and intermediate cam component 70 will be described with reference to FIG. 4. The plug body 61 is formed of a metal material. The plug body 61 has such a shape that one opening of a cylindrical component is closed. The plug body 61 has a plug fixing portion 62, a plug back wall portion 63, a plug cam portion 64, a plug internal space 65, a plug temporary joint hole 66 and a first restricting portion 100. The plug body 61 has such a configuration that the plug fixing portion 62, the plug back wall portion 63, the plug cam portion 64 and the first restricting portion 100 are integrally formed of the same metal material. The plug internal space 65 of the plug body 61 accommodates the rotation force generating spring 80.

The plug fixing portion 62 has a cylindrical shape. Part of a fixing portion outer face 62A of the plug fixing portion 62 has the plug external screw thread 62C. The plug external screw thread 62C of the plug fixing portion 62 is screwed to the opening portion internal screw thread 21D of the rack housing 21 (see FIG. 3). The nut internal screw thread 68B of the locknut 68 is screwed to the plug external screw thread 62C of the plug fixing portion 62 (see FIG. 3).

The plug back wall portion 63 has a solid structure in which no opening is formed. The plug back wall portion 63 is formed at a portion across the plug fixing portion 62 from the support yoke 50. The plug back wall portion 63 is arranged outside the rack housing 21 (see FIG. 3). The plug back wall portion 63 closes one opening of the plug internal space 65 in the plug fixing portion 62.

The plug cam portion 64 has an annular shape. The plug cam portion 64 is formed at a support yoke 50-side portion of the plug fixing portion 62. The plug cam portion 64 has a plurality of first cam faces 64A. The shape of each first cam face 64A of the plug cam portion 64 inclines in the axial direction from the separating side toward the pressing side as it advances toward one side in the circumferential direction around the axis of the plug body 61. In the plug cam portion 64, adjacent two of the first cam faces 64A in the circumferential direction are partitioned by a partitioning portion (not shown). The first cam faces 64A of the plug cam portion 64 contact second cam faces 72A of the intermediate cam component 70.

The plug internal space 65 has a cylindrical columnar shape. The plug internal space 65 is defined as a space surrounded by a fixing portion inner face 62B of the plug fixing portion 62 and a back wall portion bottom face 63A of the plug back wall portion 63. The plug internal space 65 accommodates the first restricting portion 100, a second restricting portion 200 and the rotation force generating spring 80. An intermediate cam component 70-side opening of the plug internal space 65 is closed by the intermediate cam body 71 of the intermediate cam component 70.

The plug temporary joint hole 66 extends through the plug body 61 in the axial direction. That is, the plug temporary joint hole 66 extends through the plug back wall portion 63, the plug fixing portion 62 and the plug cam portion 64. The plug temporary joint hole 66 has an outer opening portion 66A of the temporary hole at the plug back wall portion 63. The plug temporary joint hole 66 has an inner opening portion 66B of the temporary joint hole at the plug cam portion 64. The inner face of the outer opening portion 66A of the plug temporary joint hole 66 has a temporary internal screw thread 66C.

The plug cap component 67 is formed of a metal material. The plug cap component 67 has a cap component external screw thread 67A and a tool insertion hole 67B. The cap component external screw thread 67A of the plug cap component 67 is screwed to the temporary internal screw thread 66C of the plug temporary joint hole 66. The plug cap component 67 closes the temporary joint hole outer opening portion 66A.

The first restricting portion 100 protrudes from the back wall portion bottom face 63A of the plug back wall portion 63 toward the plug internal space 65. The first restricting portion 100 is inserted in a spring space (that is, the radially inner side of the rotation force generating spring) 84 of the rotation force generating spring 80. The first restricting portion 100 has a first body portion 110 and a first facing portion 120. The first restricting portion 100 has such a configuration that the first body portion 110 and the first facing portion 120 are integrally formed of the same metal material. In the first restricting portion 100, the distal end-side portion of the first body portion 110 and the first facing portion 120 are inserted in a facing accommodating space 223 of the second restricting portion 200. The first restricting portion 100 restricts rotation of the first spring end portion 81 of the rotation force generating spring 80 with respect to the plug body 61.

The first body portion 110 has a columnar shape and extends in the axial direction of the plug body 61. The first body portion 110 has a first retaining groove 114 that is formed at the middle portion of the columnar shape and that extends in the longitudinal direction. The first body portion 110 has such a configuration that the first body portion 110 is split into two columnar portions by the first retaining groove 114. The first body portion 110 has the first retaining groove 114 between one first body portion inner face 112 and the other first body portion inner face 112. The first body portion 110 has the first retaining groove 114 from a first body portion end face 113 to a connecting portion at which the first body portion 110 is connected to the plug back wall portion 63. A first body portion outer face 111 of the first body portion 110 faces the fixing portion inner face 62B of the plug fixing portion 62 and the spring winding portion 83 of the rotation force generating spring 80 via a clearance. The first body portion end face 113 of the first body portion 110 faces a second facing portion bottom face 222 of the second restricting portion 200 via a clearance.

The first facing portion 120 is formed at the distal end-side and outer-side portion of the first body portion 110. The first facing portion 120 has a first facing portion side face 121 and a first facing portion end face 122. The first facing portion side face 121 of the first facing portion 120 has the same face that is continuous with the first body portion outer face 111. The first facing portion side face 121 of the first facing portion 120 faces a second facing portion side face 221 of the second restricting portion 200, and contacts the second facing portion side face 221. The first facing portion end face 122 of the first facing portion 120 has the same face that is continuous with the first body portion end face 113. The first facing portion end face 122 of the first facing portion 120 faces the second facing portion bottom face 222 of the second restricting portion 200 via a clearance. The first facing portion 120 restricts relative movement of the plug body 61 and the intermediate cam component 70 in the radial direction of the plug body 61 and the intermediate cam component 70 by contacting the second facing portion side face 221.

The intermediate cam component 70 is formed of a metal material. The intermediate cam component 70 is arranged between the plug 60 and the intermediate ring 90 in a state where the intermediate cam component 70 is rotatable with respect to the support yoke 50, the plug 60 and the intermediate ring 90. The intermediate cam component 70 has the intermediate cam body 71, the intermediate cam portion 72, the second restricting portion 200 and a cam protruding portion 300. The intermediate cam component 70 has such a configuration that the intermediate cam body 71, the intermediate cam portion 72, the second restricting portion 200 and the cam protruding portion 300 are integrally formed of the same metal material. The intermediate cam component 70 is rotated with respect to the support yoke 50, the plug 60 and the intermediate ring 90 by force that is applied from the rotation force generating spring 80. Thus, the intermediate cam component 70 suppresses an increase in the clearance between the intermediate cam component 70 and the support yoke 50.

The intermediate cam body 71 has a circular columnar shape. A cam body back face 71B of the intermediate cam body 71 faces the back wall portion bottom face 63A of the plug back wall portion 63 and the spring winding portion 83 of the rotation force generating spring 80.

The intermediate cam portion 72 has an annular shape. The intermediate cam portion 72 is formed on the radially outer-side portion of the intermediate cam body 71. The intermediate cam portion 72 has the plurality of second cam faces 72A and a single cam temporary joint hole 73. The shape of each second cam face 72A of the intermediate cam portion 72 inclines in the axial direction from the pressing side toward the separating side as it advances toward one side in the circumferential direction around the axis of the intermediate cam body 71. In the intermediate cam portion 72, adjacent two of the second cam faces 72A in the circumferential direction are partitioned by a partitioning portion 72D. A cam portion outer face 72B of the intermediate cam portion 72 contacts the support portion inner face 21B of the rack housing 21 (see FIG. 3). In the intermediate cam portion 72, the cam temporary joint hole 73 extends through the intermediate cam portion 72 in the axial direction.

The second restricting portion 200 protrudes from the cam body back face 71B of the intermediate cam body 71 toward the plug internal space 65. The second restricting portion 200 is inserted in the spring space 84 of the rotation force generating spring 80. The second restricting portion 200 has a second body portion 210 and a second facing portion 220. The second restricting portion 200 has such a configuration that the second body portion 210 and the second facing portion 220 are integrally formed of the same metal material. The second restricting portion 200 restricts rotation of the second spring end portion 82 of the rotation force generating spring 80 with respect to the intermediate cam component 70.

The second body portion 210 has a columnar shape, and extends in the axial direction of the intermediate cam component 70. The second body portion 210 has a second retaining groove 214 that is formed at the middle portion of the columnar shape, and that extends in the longitudinal direction. The second body portion 210 has a portion having a configuration similar to the first body portion 110, and has such a configuration that the second body portion 210 is split into two columnar portions by the second retaining groove 214. The second body portion 210 has the second retaining groove 214 between one second body portion inner face 212 and the other second body portion inner face 212 (not shown). The second body portion 210 has the second retaining groove 214 from a second body portion end face 213 to a connecting portion at which the second body portion 210 is connected to the intermediate cam body 71. A second body portion outer face 211 of the second body portion 210 faces the spring winding portion 83 of the rotation force generating spring 80 via a clearance. The second body portion end face 213 of the second body portion 210 faces the back wall portion bottom face 63A of the plug back wall portion 63 via a clearance. FIG. 4 shows one of the two columnar portions that are formed in the second body portion 210 and split by the second retaining groove 214, and does not show the other columnar portion.

Second facing portions 220 each have such a shape that each second facing portion 220 is recessed radially outward of the intermediate cam component 70 with respect to the second body portion inner face 212. The second facing portions 220 are formed at the distal end-side and inner-side portion of the second body portion 210. The second facing portion 220 is formed in each of the one columnar portion and the other columnar portion that constitute the second body portion 210. Each second facing portion 220 has the second facing portion side face 221, the second facing portion bottom face 222 and the facing accommodating space 223. Each second facing portion 220 defines the facing accommodating space 223 by the second facing portion side face 221 and the second facing portion bottom face 222. In each second facing portion 220, the facing accommodating space 223 opens toward the plug back wall portion 63. FIG. 4 does not show the second facing portion 220 that is formed at the other columnar portion in the second body portion 210.

The configuration of the cam protruding portion 300 will be described with reference to FIG. 4. The cam protruding portion 300 has a cylindrical shape. The cam protruding portion 300 is formed over the range from the ring through-hole 91 of the intermediate ring 90 to the yoke hole portion 55 of the support yoke 50. The cam protruding portion 300 has a protruding portion body 310 and a tool corresponding portion 320. The cam protruding portion 300 has such a configuration that the protruding portion body 310 and the tool corresponding portion 320 are integrally formed of the same metal material. The cam protruding portion 300 is formed as a portion for fitting a tool used to rotate the intermediate cam component 70 in the process of assembling the intermediate cam component 70 to the plug 60.

The protruding portion body 310 has a cylindrical shape. The protruding portion outer face 311 of the protruding portion body 310 faces a hole portion inner face 55A of the yoke hole portion 55 and the ring inner face 93 of the intermediate ring 90 via a clearance (see FIG. 3). A protruding portion end face 312 of the protruding portion body 310 faces a hole portion bottom face 55B of the yoke hole portion 55 via a clearance (see FIG. 3).

The tool corresponding portion 320 is formed over the range from the inside of the protruding portion body 310 to the inside of the intermediate cam body 71. The tool corresponding portion 320 has a hexagon socket 322 having a shape corresponding to a hexagonal wrench key. The tool corresponding portion 320 has the hexagon socket 322 over the range from a tool corresponding portion end face 321 to the inside of the intermediate cam body 71. The tool corresponding portion end face 321 of the tool corresponding portion 320 faces the hole portion bottom face 55B of the yoke hole portion 55 via a clearance (see FIG. 3).

A method of assembling the rack shaft support device 40 will be described with reference to FIG. 3. Assembling processes of the rack shaft support device 40 include a first assembling process, a second assembling process, a third assembling process, a fourth assembling process and a fifth assembling process. The rack shaft support device 40 is finished sequentially through the first assembling process to the fifth assembling process.

The first assembling process is a process of arranging the support yoke 50 on the rack back face portion 14E of the rack shaft 14. In the first assembling process, a worker inserts the support yoke 50 from the support opening portion 21C of the rack housing 21 into the support accommodating space 25, and arranges the yoke back face portion 53 of the support yoke 50 on the rack back face portion 14E.

The second assembling process is a process of arranging the intermediate ring 90 on the resin elastic component 57 of the support yoke 50. In the second assembling process, the worker inserts the intermediate ring 90 from the support opening portion 21C of the rack housing 21 into the support accommodating space 25, and arranges the intermediate ring 90 on the resin elastic component 57 at a location at which a clearance is formed between the ring outer face 92 and the support portion inner face 21B.

The third assembling process is a process of assembling a plug assembly. The plug assembly is an assembly having such a configuration that the plug body 61, the intermediate cam component 70 and the rotation force generating spring 80 are assembled to each other and a temporary joint bolt (not shown) is inserted in the plug temporary joint hole 66 and the cam temporary joint hole 73. In the third assembling process, after assembling the plug body 61, the intermediate cam component 70 and the rotation force generating spring 80 to each other, the worker assembles the plug assembly by inserting the temporary joint bolt into the plug temporary joint hole 66 and the cam temporary joint hole 73.

The fourth assembling process is a process of fixing the plug assembly to the rack housing 21. In the fourth assembling process, the worker inserts the plug assembly from the support opening portion 21C of the rack housing 21 into the support accommodating space 25, and screws the plug external screw thread 62C of the plug body 61 to the opening portion internal screw thread 21D of the rack housing 21. In the fourth assembling process, when the entire plug external screw thread 62C is screwed to the opening portion internal screw thread 21D, the intermediate ring 90 is pressed against the resin elastic component 57 by the intermediate cam component 70 in a state where a clearance is formed between the ring front face 94 and the yoke back face portion 53.

The fifth assembling process is a process of finishing mounting of the rack shaft support device 40 on the rack housing 21. The worker screws the nut internal screw thread 68B of the locknut 68 to the plug external screw thread 62C of the plug body 61. The worker subsequently removes the temporary joint bolt from the plug temporary joint hole 66 and the cam temporary joint hole 73, and screws the cap component external screw thread 67A of the plug cap component 67 into the temporary internal screw thread 66C of the plug temporary joint hole 66. In the fifth assembling process, the plug 60 is assembled by screwing the plug cap component 67 into the plug body 61, and mounting of the rack shaft support device 40 on the rack housing 21 is finished.

A method of assembling the plug assembly will be described with reference to FIG. 4. Assembling processes of the plug assembly include a first intermediate process, a second intermediate process, a third intermediate process and a fourth intermediate process. The plug assembly is finished sequentially through the first intermediate process to the fourth intermediate process.

The first intermediate process is a process of connecting the first spring end portion 81 of the rotation force generating spring 80 to the plug body 61. In the first intermediate process, the worker inserts the rotation force generating spring 80 from the first spring end portion 81 side into the plug internal space 65, and press-fits the first spring end portion 81 to the first retaining groove 114 of the first restricting portion 100.

The second intermediate process is a process of connecting the second spring end portion 82 of the rotation force generating spring 80 to the intermediate cam component 70. In the second intermediate process, the worker inserts the second restricting portion 200 of the intermediate cam component 70 into the plug internal space 65, and press-fits the second spring end portion 82 into the second retaining groove 214 of the second restricting portion 200. In the second intermediate process, in process of press-fitting the second spring end portion 82 to the second retaining groove 214, the first body portion 110 and first facing portion 120 of the first restricting portion 100 are inserted into the facing accommodating spaces 223 of the second restricting portion 200. Therefore, an assembling location of the intermediate cam component 70 to the plug body 61 is guided by the contact between the first facing portion side face 121 and the second facing portion side faces 221.

The third intermediate process is a process of adjusting the spring force of the rotation force generating spring 80. In the third intermediate process, the worker mounts the plug body 61 on a fixing jig, and then inserts the hexagonal wrench key into the hexagon socket 322 of the cam protruding portion 300. The worker subsequently rotates the intermediate cam component 70 in a direction, in which the spring force of the rotation force generating spring 80 increases, by applying torque to the hexagonal wrench key. The worker subsequently rotates the intermediate cam component 70 with the use of the hexagonal wrench key until the rotation of the intermediate cam component 70 with respect to the plug body 61 is restricted by the contact of the partitioning portions 72D of the intermediate cam portion 72 with the partitioning portions of the plug cam portion 64. A torsion amount of the rotation force generating spring 80 reaches a prescribed torsion amount at the time when the partitioning portions 72D of the intermediate cam portion 72 are brought into contact with the partitioning portions of the plug cam portion 64. The cam temporary joint hole 73 of the intermediate cam component 70 is located coaxially with the plug temporary joint hole 66 of the plug body 61 at the time when the partitioning portions 72D of the intermediate cam portion 72 are brought into contact with the partitioning portions of the plug cam portion 64.

The fourth intermediate process is a process of inserting the temporary joint bolt into the plug body 61 and the intermediate cam component 70. In the fourth intermediate process, the worker fixes the rotation position of the intermediate cam component 70 with respect to the plug body 61 with the use of the hexagonal wrench key, and inserts the temporary joint bolt from the temporary joint hole outer opening portion 66A into the plug temporary joint hole 66 and the cam temporary joint hole 73. The worker subsequently removes the hexagonal wrench key from the cam protruding portion 300, and removes the plug body 61 from the fixing jig. In the fourth intermediate process, the plug assembly is assembled by inserting the temporary joint bolt into the plug temporary joint hole 66 and the cam temporary joint hole 73. In the plug assembly, the rotation position of the intermediate cam component 70 with respect to the plug body 61 is fixed by the temporary joint bolt.

A method of manufacturing the plug body 61 will be described with reference to FIG. 3. Manufacturing processes of the plug body 61 include a first plug manufacturing process, a second plug manufacturing process and a third plug manufacturing process. The plug body 61 is manufactured sequentially through the first plug manufacturing process to the third plug manufacturing process.

The first plug manufacturing process is a process of manufacturing a blank of the plug body 61 in a state where each of the plug fixing portion 62, the plug back wall portion 63, the plug cam portion 64, the plug internal space 65 and the first restricting portion 100 is not formed. The state where the plug fixing portion 62, and the like, are not formed includes a state where part of a corresponding portion in the plug body 61 is formed but the portion is not finished and a state where a corresponding portion in the plug body 61 is not formed.

The second plug manufacturing process is a process of forming the first restricting portion 100 in the blank of the plug body 61 through cold forging of the blank of the plug body 61, the blank being formed in the first plug manufacturing process. In the blank before the second plug manufacturing process, an unprocessed material portion is present in the plug internal space 65 that is present around the first restricting portion 100 in the processed plug body 61. In addition, a space is present at a portion at which the first restricting portion 100 will be formed.

In the second plug manufacturing process, the material portion that fills the plug internal space 65 is stamped, and the material portion is pushed out to the space corresponding to the portion at which the first restricting portion 100 will be formed. The first restricting portion 100 is formed from the material portion pushed out to the space corresponding to the portion at which the first restricting portion 100 will be formed. In addition, in the second plug manufacturing process, when it is required to adjust the radial size of the press-molded first restricting portion 100, the outer face of the first restricting portion 100 is processed by cutting.

In the plug body 61, as a result of forming the first restricting portion 100 through cold forging, the fixing portion inner face 62B of the plug fixing portion 62, the first body portion outer face 111 and first body portion inner face 112 of the first body portion 110 and the first facing portion side face 121 of the first facing portion 120 are formed. Therefore, these faces in the plug body 61 that is a finished product have a material structure formed through forging. When additional processing, such as cutting, is applied to at least one face of those faces after cold forging, the additionally processed face has a material structure formed through additional processing.

The third plug manufacturing process is a process of forming the plug external screw thread 62C, the plug temporary joint hole 66, the temporary internal screw thread 66C and the first cam faces 64A. The sequence of manufacturing these portions is set on the basis of, for example, processability of each portion. When the third plug manufacturing process is completed, the plug body 61 is finished.

The action and operation of the rack shaft support device 40 will be described with reference to FIG. 2. The rack shaft support device 40 has two functions. The first function is a function of suppressing movement of the rack shaft 14 in the separating direction with respect to the pinion shaft 13. The second function is a function of suppressing an increase in a clearance at a meshing portion between the rack gear 14C and the pinion gear 13A due to an advance of abrasion of the friction portion of the rack shaft 14. The friction portion of the rack shaft 14 includes a meshing portion between the rack gear 14C and the pinion gear 13A and a contact portion between the rack back face portion 14E and the low friction sheet 56 of the support yoke 50.

The first function of the rack shaft support device 40 will be described. The first cam faces 64A of the plug body 61 of the plug 60 are in contact with the second cam faces 72A of the intermediate cam component 70. Thus, movement of the intermediate cam component 70 in the separating direction with respect to the rack housing 21, and the like, is restricted. The intermediate cam component 70 supports the yoke back face portion 53 of the support yoke 50 via the intermediate ring 90 and the resin elastic component 57. Thus, movement of the support yoke 50 in the separating direction with respect to the rack housing 21, and the like, is restricted. The yoke support portion 52 of the support yoke 50 supports the rack back face portion 14E of the rack shaft 14.

Therefore, movement of the rack shaft 14 in the separating direction with respect to the pinion shaft 13 is restricted. This suppresses occurrence of contact noise between the components due to movement of the rack shaft 14 in the separating direction and the pressing direction with respect to the pinion shaft 13 with the rotation of the pinion shaft 13. In the rack shaft support device 40, a clearance is formed between the yoke back face portion 53 and the intermediate ring 90. Therefore, when the yoke body 51 receives force acting in the separating direction from the rack shaft 14, the yoke body 51 is allowed to move in the separating direction by the amount of the clearance between the yoke back face portion 53 and the intermediate ring 90. When the yoke body 51 moves in the separating direction with respect to the rack housing 21, and the like, the amount of compression deformation of the resin elastic component 57 is increased. Therefore, force that the resin elastic component 57 presses the yoke body 51 in the pressing direction increases.

The second function of the rack shaft support device 40 will be described. The rotation force generating spring 80 applies force to the intermediate cam component 70 to cause the intermediate cam component 70 to rotate with respect to the plug body 61. That is, the rotation force generating spring 80 applies force to the intermediate cam component 70 to cause the second cam faces 72A to rotate with respect to the first cam faces 64A.

Spring force that is applied to the intermediate cam component 70 acts on the first cam faces 64A. The first cam faces 64A incline from the separating side toward the pressing side. Thus, the applied spring force is decomposed into components having directions that respectively incline along the first cam faces 64A, and then act in a direction around the axis of the intermediate cam component 70. Therefore, the second cam faces 72A that are in contact with the first cam faces 64A attempt to move in the pressing direction with respect to the first cam faces 64A due to spring force that is applied to the intermediate cam component 70. That is, the intermediate cam component 70 attempts to move in the pressing direction with respect to the plug body 61 due to the contact between the second cam faces 72A and the first cam faces 64A and the spring force that is applied from the rotation force generating spring 80.

On the other hand, movement of the intermediate cam component 70 in the pressing direction with respect to the rack housing 21, and the like, is restricted by the support yoke 50. Therefore, in a state where spring force is applied from the rotation force generating spring 80 to the intermediate cam component 70, the intermediate cam component 70 does not move in the pressing direction with respect to the plug body 61. However, when the amount of abrasion of the friction portion of the rack shaft 14 increases, an allowable movement range of the yoke body 51 is expanded with respect to the rack housing 21, and the like, in the pressing direction. Therefore, the allowable movement range of the intermediate cam component 70 also expands with respect to the rack housing 21, and the like, in the pressing direction.

With the above configuration, the intermediate cam component 70 rotates with respect to the plug body 61 due to the spring force of the rotation force generating spring 80. Therefore, the cam body front face 71A and cam portion front face 72C of the intermediate cam component 70 move in the pressing direction from the location before the intermediate cam component 70 is rotated with respect to the plug body 61. A relative positional relationship in the pressing direction between the cam body front face 71A and cam portion front face 72C and the yoke back face portion 53 is kept substantially the same as the relationship before the intermediate cam component 70 is rotated with respect to the plug body 61. That is, a relative positional relationship in the pressing direction between the intermediate cam component 70 and the yoke body 51 is kept substantially the same as the relationship before the amount of abrasion of the friction portion of the rack shaft 14 increases.

This suppresses an increase in the movement range of the yoke body 51 in the separating direction with respect to the rack back face portion 14E due to an increase in the amount of abrasion of the friction portion of the rack shaft 14. Therefore, even when the amount of abrasion of the friction portion of the rack shaft 14 increases, occurrence of contact noise between the pinion shaft 13 and the rack shaft 14 is suppressed.

The steering system 1 according to the present embodiment has the following advantageous effects. The steering system 1 includes the rack shaft support device 40. In the rack shaft support device 40, the first facing portion 120 of the first restricting portion 100 face the second facing portions 220 of the second restricting portion 200. With this configuration, in the direction that intersects with the axis of the plug body 61 and the axis of the intermediate cam component 70 (the radial direction of the plug body 61 and the intermediate cam component 70), relative movement between the plug body 61 and the intermediate cam component 70 is restricted. That is, the first restricting portion 100 and the second restricting portion 200 have the function of positioning the plug body 61 and the intermediate cam component 70 in the radial direction of the plug body 61 and the intermediate cam component 70.

In the rack shaft support device 40, when the plug body 61 and the intermediate cam component 70 are assembled to each other, the location at which the intermediate cam component 70 is assembled to the plug body 61 is guided by the first facing portion 120 and the second facing portions 220. This suppresses assembling of the plug body 61 to the intermediate cam component 70 in a state where a relative positional relationship between the first cam faces 64A and the second cam faces 72A deviates from a proper positional relationship. In addition, this improves workability at the time when the plug body 61 and the intermediate cam component 70 are assembled to each other.

Figure 9:
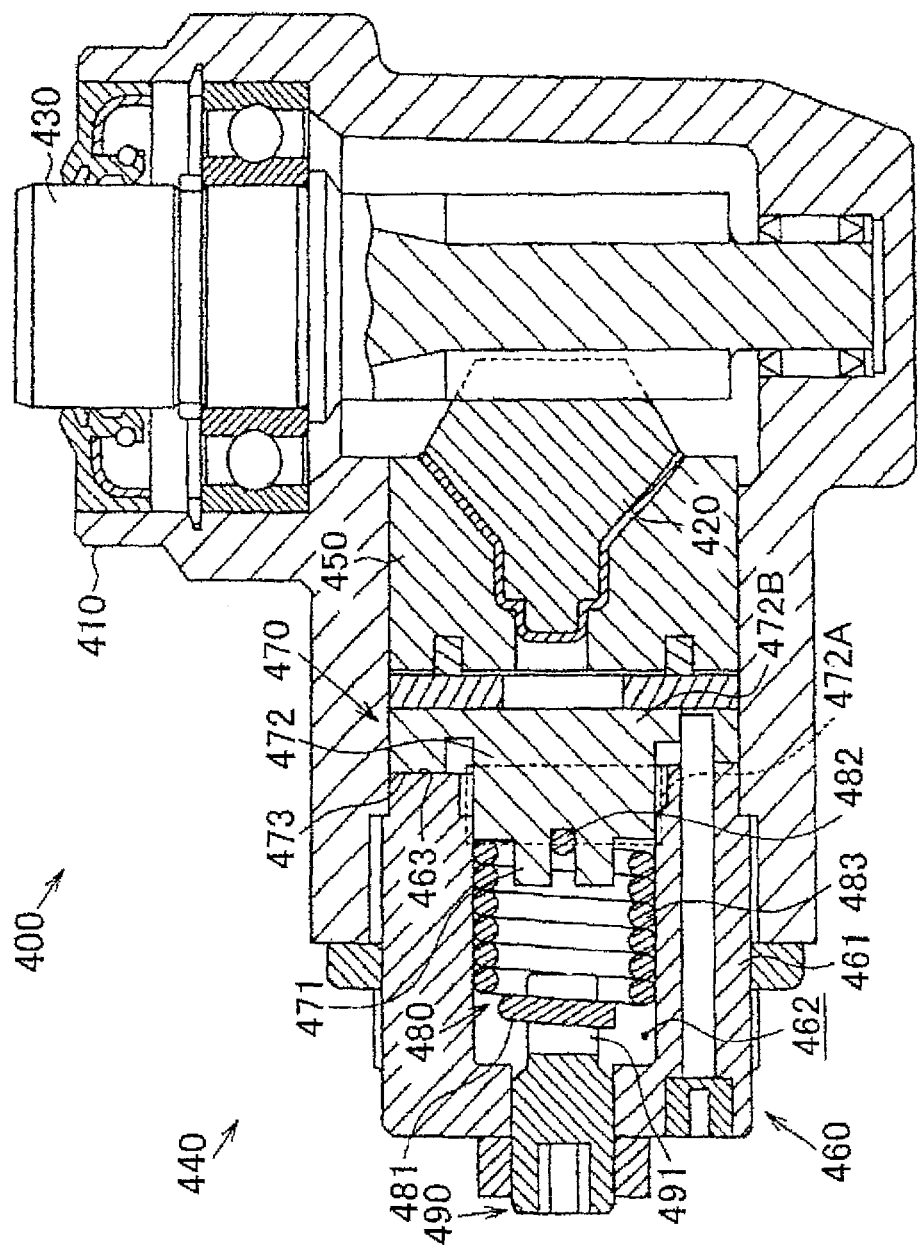
FIG. 9 is a cross-sectional view of a rack shaft support device according to the related art and is a cross-sectional view that shows the cross-sectional structure of the rack shaft support device and its surrounding portion.

In the rack shaft support device 40, each of the first restricting portion 100 and the second restricting portion 200 that position the plug body 61 and the intermediate cam component 70 has a shape such that each of the first restricting portion 100 and the second restricting portion 200 protrudes from the plug back wall portion 63 or the intermediate cam body 71 toward the plug internal space 65. Therefore, it is possible to form an overlapped portion at which the rotation force generating spring 80 overlaps with the first restricting portion 100 and the second restricting portion 200 in the axial direction of the intermediate cam body 71. Therefore, in comparison with the case where the portion for positioning the plug body 61 and the intermediate cam component 70 fills the intermediate cam component 70-side portion of the plug internal space 65, it is possible to reduce the size of the rack shaft support device 40 in the pressing direction. The above-described configuration of the rack shaft support device 440 shown in FIG. 9 may be an example of the above-described comparison target configuration.

In the rack shaft support device 40, the first facing portion side face 121 of the first restricting portion 100 contacts the second facing portion side faces 221 of the second restricting portion 200. With this configuration, in comparison with the case where there is a clearance between the first facing portion side face 121 and the second facing portion side faces 221, a relative positional relationship in the radial direction between the plug body 61 and the intermediate cam component 70 becomes stable.

In the rack shaft support device 40, the first restricting portion 100 has the first body portion 110 and the first facing portion 120, and the second restricting portion 200 has the second body portion 210 and the second facing portions 220. That is, the first restricting portion 100 and the second restricting portion 200 have the function of positioning the plug body 61 and the intermediate cam component 70 in the radial direction of the plug body 61 and the intermediate cam component 70 and the function of retaining the rotation force generating spring 80. With this configuration, in comparison with the case where a portion having the function of positioning the plug body 61 and the intermediate cam component 70 and a portion having the function of retaining the rotation force generating spring 80 are individually formed, the configuration of the rack shaft support device 40 is simplified.

In the rack shaft support device 40, the first restricting portion 100 and the second restricting portion 200 are arranged in the spring space 84 of the rotation force generating spring 80. With this configuration, in comparison with the case where the first restricting portion 100 and the second restricting portion 200 are arranged outside the spring space 84 in the axial direction of the rotation force generating spring 80, an overlapped portion of the components increases in the pressing direction of the rack shaft support device 40. Therefore, it is possible to reduce the size of the rack shaft support device 40 in the pressing direction.

The rack shaft support device 40 includes the intermediate cam component 70 having the cam protruding portion 300. With this configuration, in the process (third intermediate process) of adjusting the magnitude of the spring force of the rotation force generating spring 80, it is possible to fit a tool to the cam protruding portion 300. Then, by rotating the intermediate cam component 70 with respect to the plug body 61 with the use of the tool, it is possible to adjust the magnitude of the spring force of the rotation force generating spring 80. Therefore, it is possible to omit an adjusting bolt from the rack shaft support device. Hence, it is possible to reduce the size of the rack shaft support device 40 in the pressing direction.

In the rack shaft support device 40, the cam protruding portion 300 has the tool corresponding portion 320. With this configuration, in the process of adjusting the magnitude of the spring force of the rotation force generating spring 80, it is possible to fit the hexagonal wrench key to the hexagon socket 322 of the tool corresponding portion 320. By rotating the intermediate cam component 70 with respect to the plug body 61 with the use of the hexagonal wrench key, it is possible to adjust the magnitude of the spring force of the rotation force generating spring 80. Therefore, in comparison with the case where the tool corresponding portion 320 is not formed in the cam protruding portion 300, workability of work for rotating the intermediate cam component 70 with respect to the plug body 61 improves.

In the rack shaft support device 40, the cam protruding portion 300 is inserted into the yoke hole portion 55 of the support yoke 50. Therefore, in comparison with the case where the cam protruding portion 300 is arranged outside the support yoke 50 in the axial direction of the intermediate cam component 70, it is possible to reduce the size of the rack shaft support device 40 in the pressing direction.

In the rack shaft support device 40, the support yoke 50 supports the rack back face portion 14E of the rack shaft 14. With this configuration, occurrence of contact noise between the components due to movement of the rack shaft 14 in the separating direction and the pressing direction with respect to the pinion shaft 13 with the rotation of the pinion shaft 13 is suppressed.

The rack shaft support device 40 includes the rotation force generating spring 80 that rotates the intermediate cam component 70 with respect to the plug body 61. With this configuration, when the amount of abrasion of the friction portion of the rack shaft 14 increases, the intermediate cam component 70 rotates with respect to the plug body 61. Therefore, a relative positional relationship in the pressing direction between the intermediate cam component 70 and the yoke body 51 is kept substantially the same as the relationship before the amount of abrasion of the friction portion of the rack shaft 14 increases. Therefore, even when the amount of abrasion of the friction portion of the rack shaft 14 increases, occurrence of contact noise between the pinion shaft 13 and the rack shaft 14 is suppressed.

In the above-described embodiment, the relationship between the plurality of elements that are described to have the same axis includes a case where the axes of the plurality of elements coincide with each other and a case where the axes of the plurality of elements may be assumed to substantially coincide with each other.

The axis of the plug body 61 indicates the rotation axis of the plug body 61. The radial direction of the plug body 61 indicates the direction perpendicular to the axis of the plug body 61. The axis of the locknut 68 indicates the rotation axis of the locknut 68. The radial direction of the locknut 68 indicates the direction perpendicular to the axis of the locknut 68. The axis of the intermediate cam component 70 indicates the rotation axis of the intermediate cam component 70. The radial direction of the intermediate cam component 70 indicates the direction perpendicular to the axis of the intermediate cam component 70. The axis of the intermediate ring 90 indicates the axis located along the same axis as the axes of the plug body 61, and the like. The radial direction of the intermediate ring 90 indicates the direction perpendicular to the axis of the intermediate ring 90. The axis of the yoke body 51 indicates the axis located along the same axis as the axes of the plug body 61, and the like. The radial direction of the yoke body 51 indicates the direction perpendicular to the axis of the yoke body 51. The pressing direction of the rack shaft support device 40 indicates the same direction as the axial direction of the plug body 61, or the like.

Other Embodiments

The invention includes embodiments other than the above-described embodiment. Hereinafter, alternative embodiments to the above-described embodiment will be described as other embodiments of the invention. The following alternative embodiments may be implemented in combination with each other.

The support yoke 50 according to the above-described embodiment has such a configuration that the yoke body 51, the yoke support portion 52 and the yoke back face portion 53 are integrally formed of the same metal material. In contrast, the support yoke 50 according to an alternative embodiment has such a configuration that at least one of the yoke support portion 52 and the yoke back face portion 53 is formed as an individual component independently of the yoke body 51. The support yoke 50 according to the alternative embodiment has such a configuration that the at least one of the yoke support portion 52 and the yoke back face portion 53, which is formed as the individual component, is connected to the yoke body 51. In the support yoke 50 according to the alternative embodiment, at least one of the yoke support portion 52 and the yoke back face portion 53 may be formed of a material different from that of the yoke body 51.

The plug body 61 of the plug 60 according to the above-described embodiment has such a configuration that the plug fixing portion 62, the plug back wall portion 63 and the plug cam portion 64 are integrally formed of the same metal material. In contrast, the plug 60 according to an alternative embodiment has such a configuration that at least one of the plug back wall portion 63 and the plug cam portion 64 is formed as an individual component independent of the plug fixing portion 62. The plug body 61 according to the alternative embodiment has such a configuration that the at least one of the plug back wall portion 63 and the plug cam portion 64, which is formed as the individual component, is connected to the plug fixing portion 62. In the plug body 61 according to the alternative embodiment, at least one of the plug back wall portion 63 and the plug cam portion 64 may be formed of a material different from that of the plug fixing portion 62.

The plug body 61 of the plug 60 according to the above-described embodiment has such a configuration that the plug back wall portion 63 and the first restricting portion 100 are integrally formed of the same metal material. In contrast, the plug body 61 according to an alternative embodiment has such a configuration that the first restricting portion 100 is formed as an individual component independent of the plug back wall portion 63. The plug body 61 according to the alternative embodiment has such a configuration that the first restricting portion 100 is connected to the plug back wall portion 63. In the plug body 61 according to the alternative embodiment, the first restricting portion 100 may be formed of a material different from that of the plug back wall portion 63.

The intermediate cam component 70 according to the above-described embodiment has such a configuration that the intermediate cam body 71 and the second restricting portion 200 are integrally formed of the same metal material. In contrast, the intermediate cam component 70 according to an alternative embodiment has such a configuration that the second restricting portion 200 is formed as an individual component independent of the intermediate cam body 71. The intermediate cam component 70 according to the alternative embodiment has such a configuration that the second restricting portion 200 is connected to the intermediate cam body 71. In the intermediate cam component 70 according to the alternative embodiment, the second restricting portion 200 may be formed of a material different from that of the intermediate cam body 71.

Figure 5:
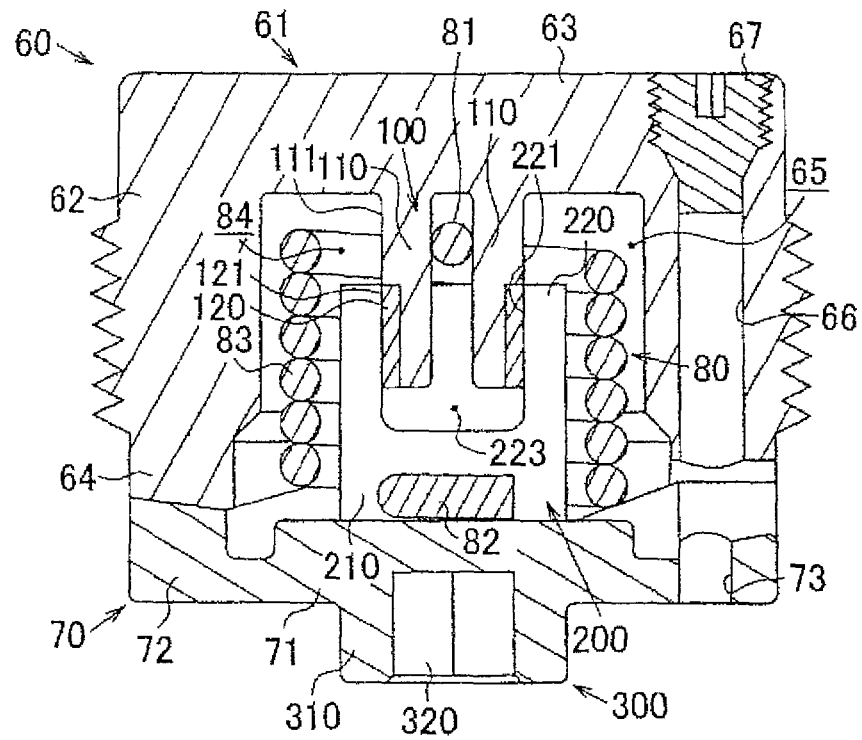
FIG. 5 is a cross-sectional view of a rack shaft support device according to another embodiment and is a cross-sectional view that shows the enlarged structure of a plug body, an intermediate cam component and a rotation force generating spring.

The first restricting portion 100 of the plug 60 according to the above-described embodiment has such a configuration that the first body portion 110 and the first facing portion 120 are integrally formed of the same metal material. In contrast, the first restricting portion 100 according to an alternative embodiment shown in FIG. 5 has such a configuration that the first facing portion 120 is formed as an individual component independent of the first body portion 110. The first restricting portion 100 according to the alternative embodiment has such a configuration that the first facing portion 120 is connected to the first body portion 110. In the first restricting portion 100 according to the alternative embodiment, the first facing portion 120 may be formed of a material different from that of the first body portion 110.

Figure 6:
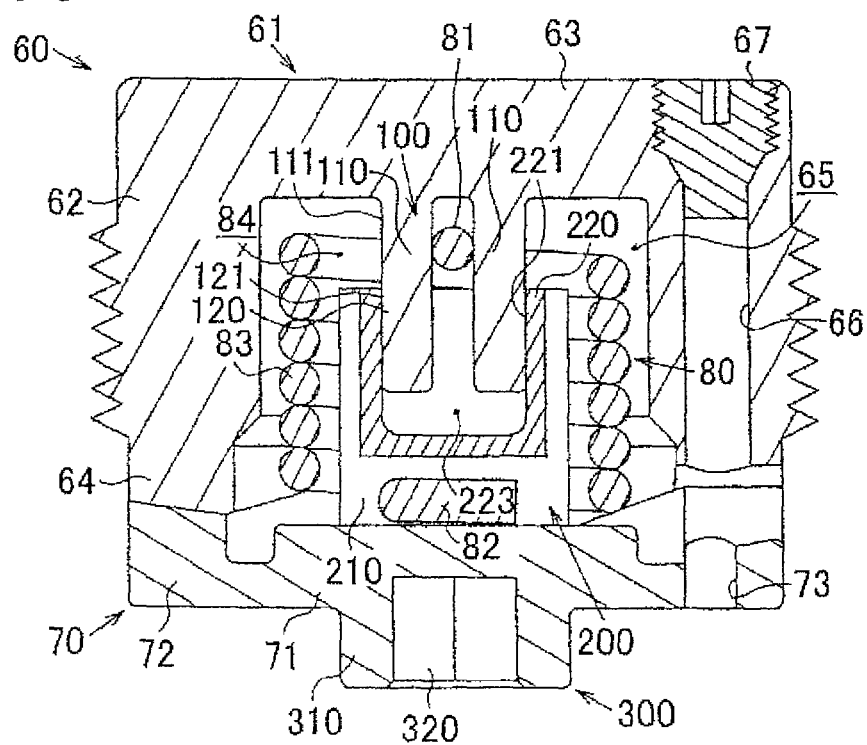
FIG. 6 is a cross-sectional view of a rack shaft support device according to another embodiment and is a cross-sectional view that shows the enlarged structure of a plug body, an intermediate cam component and a rotation force generating spring.

The second restricting portion 200 of the intermediate cam component 70 according to the above-described embodiment has such a configuration that the second body portion 210 and the second facing portions 220 are integrally formed of the same metal material. In contrast, the second restricting portion 200 according to an alternative embodiment shown in FIG. 6 has such a configuration that the second facing portions 220 are formed as individual components independent of the second body portion 210. The second restricting portion 200 according to the alternative embodiment has such a configuration that the second facing portions 220 are connected to the second body portion 210. In the second restricting portion 200 according to the alternative embodiment, the second facing portions 220 may be formed of a material different from the second body portion 210.

The intermediate cam component 70 according to the above-described embodiment has such a configuration that the intermediate cam body 71 and the cam protruding portion 300 are integrally formed of the same metal material. In contrast, the intermediate cam component 70 according to an alternative embodiment has such a configuration that the cam protruding portion 300 is formed as an individual component independent of the intermediate cam body 71. The intermediate cam component 70 according to the alternative embodiment has such a configuration that the cam protruding portion 300 is connected to the intermediate cam body 71. In the intermediate cam component 70 according to the alternative embodiment, the cam protruding portion 300 may be formed of a material different from that of the intermediate cam body 71.

Figure 7:
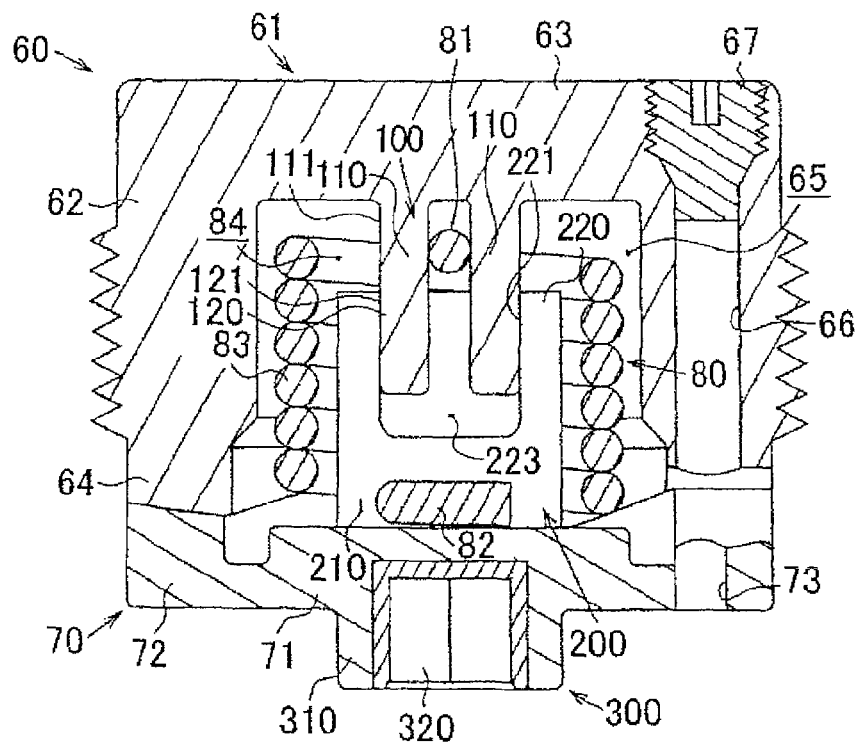
FIG. 7 is a cross-sectional view of a rack shaft support device according to another embodiment and is a cross-sectional view that shows the enlarged structure of a plug body, an intermediate cam component and a rotation force generating spring.

The cam protruding portion 300 of the intermediate cam component 70 according to the above-described embodiment has such a configuration that the protruding portion body 310 and the tool corresponding portion 320 are integrally formed of the same metal material. In contrast, the cam protruding portion 300 shown in FIG. 7 has such a configuration that the tool corresponding portion 320 is formed as an individual component independent of the protruding portion body 310. The cam protruding portion 300 according to the alternative embodiment has such a configuration that the tool corresponding portion 320 is connected to the protruding portion body 310. In the cam protruding portion 300 according to the alternative embodiment, the tool corresponding portion 320 may be formed of a material different from that of the protruding portion body 310.

The protruding portion end face 312 of the cam protruding portion 300 according to the above-described embodiment faces the hole portion bottom face 55B of the yoke hole portion 55 via a clearance. In contrast, the protruding portion end face 312 of the cam protruding portion 300 according to an alternative embodiment contacts the hole portion bottom face 55B of the yoke hole portion 55.

The protruding portion outer face 311 of the cam protruding portion 300 according to the above-described embodiment faces the hole portion inner face 55A of the yoke hole portion 55 via a clearance. In contrast, at least part of the protruding portion outer face 311 of the cam protruding portion 300 according to an alternative embodiment contacts the hole portion inner face 55A.

The cam protruding portion 300 according to the above-described embodiment has the tool corresponding portion 320 having the hexagon socket 322. In contrast, the cam protruding portion 300 according to an alternative embodiment has a tool corresponding portion having a polygonal outer shape corresponding to a wrench, instead of the tool corresponding portion 320. In the cam protruding portion 300 according to the alternative embodiment, the polygonal outer shape of the tool corresponding portion has the outer shape of the distal end portion of the protruding portion body 310.

The cam protruding portion 300 according to the above-described embodiment has the protruding portion body 310 and the tool corresponding portion 320. In contrast, the cam protruding portion 300 according to an alternative embodiment has such a configuration that the tool corresponding portion 320 is omitted. In the cam protruding portion 300 according to the alternative embodiment, the portion corresponding to the tool corresponding portion 320 is filled by, for example, forming the protruding portion body 310 as a solid portion.

In the rack shaft support device 40 having the cam protruding portion 300 according to the alternative embodiment, in the process of assembling the plug body 61, the intermediate cam component 70 and the rotation force generating spring 80 to one another, it is possible to fit the tool to the cam protruding portion 300 (protruding portion body 310). Then, by rotating the intermediate cam component 70 with respect to the plug 60 with the use of the tool fitted to the cam protruding portion 300, it is possible to adjust the magnitude of the spring force of the rotation force generating spring 80. With the above configuration, it is possible to omit an adjusting bolt from the rack shaft support device. Therefore, it is possible to reduce the size of the rack shaft support device 40 in the pressing direction.

In the rack shaft support device 40 according to the above-described embodiment, the intermediate cam component 70 has the single cam protruding portion 300, and the support yoke 50 has the single yoke hole portion 55 corresponding to the cam protruding portion 300. In contrast, the rack shaft support device 40 according to an alternative embodiment has any one of the following configurations (1) to (3).

(1) In the rack shaft support device 40 according to the alternative embodiment, the intermediate cam component 70 has a plurality of the cam protruding portions 300, and the support yoke 50 has the single yoke hole portion 55 into which the plurality of cam protruding portions 300 are inserted.

(2) In the rack shaft support device 40 according to the alternative embodiment, the intermediate cam component 70 has a plurality of the cam protruding portions 300, and the support yoke 50 has a plurality of the yoke hole portions 55 into which the plurality of cam protruding portions 300 are respectively individually inserted.

(3) The rack shaft support device 40 according to the alternative embodiment has the intermediate cam component 70 from which the cam protruding portion 300 is omitted. In the rack shaft support device 40, the yoke hole portion 55 of the support yoke 50 may also be omitted.

The rack shaft support device 40 according to the above-described embodiment has such a configuration that the first restricting portion 100 and the second restricting portion 200 are inserted in the spring space 84. In contrast, in the rack shaft support device 40 according to an alternative embodiment, the first restricting portion 100 and the second restricting portion 200 have a winding portion accommodating space that accommodates the rotation force generating spring 80. In the rack shaft support device 40 according to the alternative embodiment, the rotation force generating spring 80 is inserted into the winding portion accommodating space, and, as a result, the rotation force generating spring 80 is covered therearound with the first restricting portion 100 and the second restricting portion 200 in the radial direction of the plug body 61.

The rack shaft support device 40 according to the above-described embodiment has such a configuration that the first facing portion side face 121 of the first restricting portion 100 contacts the second facing portion side faces 221 of the second restricting portion 200. In contrast, the rack shaft support device 40 according to an alternative embodiment has such a configuration that the first facing portion side face 121 faces the second facing portion side faces 221 via a clearance in the radial direction of the intermediate can component 70. In the rack shaft support device 40 according to the alternative embodiment, the first facing portion side face 121 and the second facing portion side faces 221 contact each other through relative movement of the first restricting portion 100 and the second restricting portion 200 in the radial direction of the intermediate cam component 70. Relative movement of the plug body 61 and the intermediate cam component 70 in the radial direction of the intermediate cam component 70 is restricted by the mutual contact of the first facing portion side face 121 and the second facing portion side faces 221. With the rack shaft support device 40 according to the alternative embodiment, rotation resistance reduces at the time when the intermediate cam component 70 rotates with respect to the plug body 61 in comparison with the configuration that the first facing portion side face 121 and the second facing portion side faces 221 are in contact with each other. Therefore, even when the spring force of the rotation force generating spring 80 is reduced, it is possible to rotate the intermediate cam component 70 with respect to the plug body 61.

Figure 8:
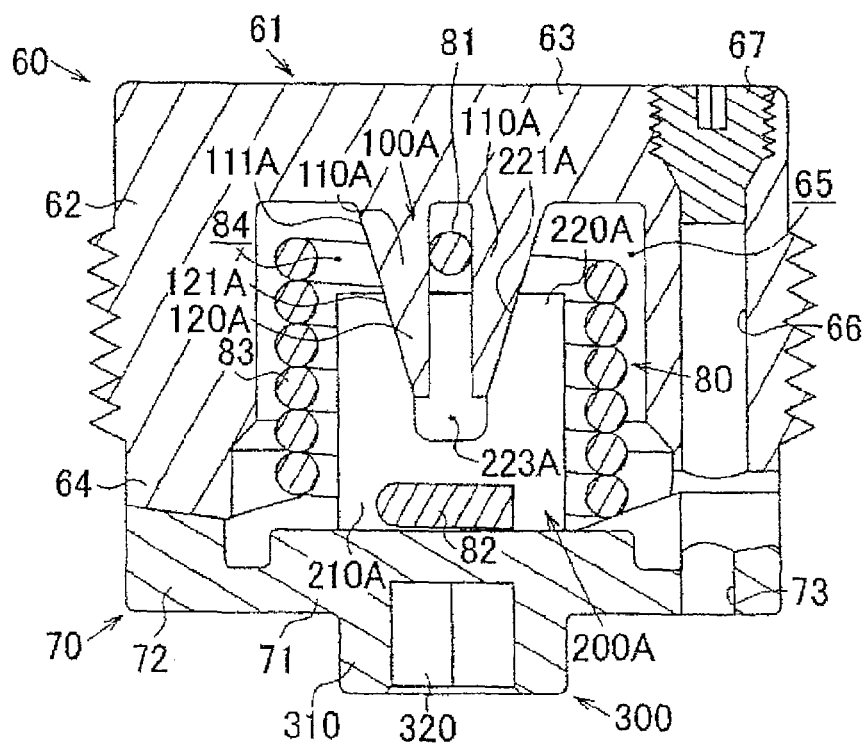
FIG. 8 is a cross-sectional view of a rack shaft support device according to another embodiment and is a cross-sectional view that shows the enlarged structure of a plug body, an intermediate cam component and a rotation force generating spring.

The rack shaft support device 40 according to the above-described embodiment includes the first restricting portion 100 that has the first body portion outer face 111 and the first facing portion side face 121 in shape along the axial direction of the plug body 61. In addition, the rack shaft support device 40 according to the above-described embodiment includes the second restricting portion 200 that has the second facing portion side faces 221 in shape along the axial direction of the intermediate cam component 70. In contrast, the rack shaft support device 40 according to an alternative embodiment shown in FIG. 8 includes a first restricting portion 100A instead of the first restricting portion 100 and a second restricting portion 200A instead of the second restricting portion 200.

The first restricting portion 100A according to the alternative embodiment has a configuration different from the first restricting portion 100 according to the above-described embodiment in the following point and has the same configuration as the first restricting portion 100 in the other portions. The first restricting portion 100A has a first body portion 110A and a first facing portion 120A. In the first restricting portion 100A, the distal end-side portion of the first body portion 110A and the first facing portion 120A are inserted in facing accommodating spaces 223A of the second restricting portion 200A.

The first body portion 110A has a first body portion outer face 111A. In the first body portion 110A, the first body portion outer face 111A inclines radially inward as it advances toward the pressing side in the axial direction of the plug body 61.

The first facing portion 120A has a first facing portion side face 121A. The first facing portion side face 121A of the first facing portion 120A has the same face that is continuous with the first body portion outer face 111A. In the first facing portion 120A, the first facing portion side face 121A inclines radially inward as it advances toward the pressing side in the axial direction of the plug body 61.

The second restricting portion 200A according to the alternative embodiment has a configuration different from the second restricting portion 200 according to the above-described embodiment in the following point, and has the same configuration as the second restricting portion 200 in the other portions. The second restricting portion 200A has a second body portion 210A and second facing portions 220A.

The second facing portions 220A each have a second facing portion side face 221A and the facing accommodating spaces 223A. In the second facing portions 220A, the second facing portion side faces 221A incline radially inward as it advances toward the pressing side in the axial direction of the intermediate cam component 70. The second facing portion side faces 221A of the second facing portion 220A face the first facing portion side face 121A, and contact the first facing portion side face 121A.

The rack shaft support device 40 according to the above-described embodiment has such a configuration that the distal end-side portion of the first body portion 110 of the first restricting portion 100 and the first facing portion 120 of the first restricting portion 100 are inserted in the facing accommodating spaces 223 of the second restricting portion 200. In contrast, the rack shaft support device 40 according to an alternative embodiment has such a configuration that the first restricting portion 100 has a facing accommodating space corresponding to the facing accommodating spaces 223 and the distal end-side portion of the second body portion 210 and the second facing portions 220 are inserted in the facing accommodating space. The rack shaft support device 40 according to the alternative embodiment specifically, for example, has the following configuration. In the rack shaft support device 40, instead of the first restricting portion 100 according to the embodiment, the plug body 61 has a restricting portion having the same structure as the second restricting portion 200. In the rack shaft support device 40, instead of the second restricting portion 200 according to the embodiment, the intermediate cam component 70 has a restricting portion having the same structure as the first restricting portion 100. The restricting portion of the plug body 61 and the restricting portion of the intermediate cam component 70 have the same relationship as the relationship between the first restricting portion 100 and the second restricting portion 200 in the rack shaft support device 40 according to the embodiment.

The rack shaft support device 40 according to the above-described embodiment has such a configuration that the first facing portion 120 of the first restricting portion 100 face the second facing portions 220 of the second restricting portion 200. That is, in the rack shaft support device 40, relative movement of the plug body 61 and the intermediate cam component 70 in the radial direction of the intermediate cam component 70 is restricted by the first facing portion 120 and the second facing portions 220. In contrast, the rack shaft support device 40 according to an alternative embodiment has such a configuration that the first facing portion 120 and the second facing portions 220 are omitted. In the rack shaft support device 40 according to the alternative embodiment, the intermediate cam component 70, for example, has a portion corresponding to the first restricting portion 472A in the rack shaft support device 440 shown in FIG. 9. Then, relative movement of the plug body 61 and the intermediate cam component 70 in the radial direction of the intermediate cam component 70 is restricted by the contact of that portion with the plug fixing portion 62. In short, as long as a configuration is able to restrict relative movement of the plug body 61 and the intermediate cam component 70 in the radial direction of the intermediate cam component 70, other configurations different from the first facing portion 120 and the second facing portions 220 illustrated in the above-described embodiment may be used.

The rack shaft support device 40 according to the above-described embodiment includes the helical torsion spring as the rotation force generating spring 80. In contrast, the rack shaft support device 40 according to an alternative embodiment includes a spiral spring as the rotation force generating spring 80.

The rack shaft support device 40 according to the above-described embodiment has such a configuration that the resin elastic component 57 is mounted on the yoke body 51. In contrast, the rack shaft support device 40 according to an alternative embodiment has such a configuration that the resin elastic component 57 is mounted on the intermediate cam component 70 instead of the yoke body 51. In the rack shaft support device 40 according to the alternative embodiment, the intermediate ring 90 is pressed against the yoke back face portion 53 of the support yoke 50 by the restoring force of the resin elastic component 57.

The steering system 1 according to the above-described embodiment includes the rack shaft 14 of which the shape of the cross section perpendicular to the axial direction is similar to a D shape. In contrast, the steering system 1 according to an alternative embodiment includes a rack shaft of which the shape of the cross section perpendicular to the axial direction is similar to a Y shape, instead of the rack shaft 14.

The steering system 1 according to the above-described embodiment is configured as a rack-parallel-type electric power steering system. In contrast, a steering system according to an alternative embodiment is configured as a column-assist-type, a pinion-assist-type, a dual-pinion-assist-type or a rack-coaxial-type electric power steering system.

The steering system 1 according to the above-described embodiment is configured as an electric power steering system having the assist device 30. In contrast, a steering system according to an alternative embodiment is configured as a mechanical steering system from which the assist device 30 is omitted.

In short, as long as a steering system includes a rack shaft and a pinion shaft, the invention is also applicable to an electric power steering system other than the rack-parallel-type electric power steering system and a steering system other than the electric power steering system.

What is claimed is:

1. A rack shaft support device comprising:
 a support yoke arranged in an accommodating portion of a rack housing for accommodating a rack shaft, the support yoke moving the rack shaft in a pressing direction toward a pinion shaft in the accommodating portion;
 a plug including:
  a plug fixing portion arranged across the support yoke from the rack shaft in the accommodating portion, the plug fixing portion being fixed to the rack housing,
  a plug cam portion having a first cam face, the plug cam portion being arranged closer to the support yoke than the plug fixing portion,
  a plug back wall portion formed across the plug fixing portion from the support yoke, and
  a first restricting portion having a first body portion and a first facing portion, the first restricting portion protruding from the plug back wall portion toward the support yoke;
 an intermediate cam component including:
  an intermediate cam body arranged closer to the support yoke than the plug in the accommodating portion, and the intermediate cam body having an axis extending in the pressing direction,
  an intermediate cam portion having a second cam face contacting the first cam face, the intermediate cam portion being formed around the intermediate cam body, and
  a second restricting portion having a second body portion and a second facing portion, the second restricting portion protruding from the intermediate cam body toward the plug and overlapping the first restricting portion in a direction intersecting with the axis of the intermediate cam body; and
 a rotation force generating spring connected to the plug, the rotation generating spring applying a force to the intermediate cam component to cause the intermediate cam component to rotate with respect to the plug, the rotation force generating spring having a coil-shaped spring winding portion, a first spring end portion and a second spring end portion, wherein the first restricting portion and the second restricting portion are inserted in a radially inner side of the spring winding portion, the first body portion of the first restricting portion retains the first spring end portion, and the first facing portion of the first restricting portion overlaps the second restricting portion in the direction that intersects with the axis of the intermediate cam body, and the second body portion of the second restricting portion retains the second spring end portion, and the second facing portion of the second restricting portion overlaps the first facing portion in the direction that intersects with the axis of the intermediate cam body.

2. The rack shaft support device according to claim 1, wherein the second restricting portion overlaps the first restricting portion with a clearance in the direction that intersects with the axis of the intermediate cam body.

3. The rack shaft support device according to claim 1, wherein the support yoke includes: (i) a yoke back face portion that is formed at a portion across from the rack shaft, and (ii) a yoke hole portion that is open at the yoke back face portion, and the intermediate cam component includes a cam protruding portion that protrudes from the intermediate cam body toward the yoke back face portion, and the cam protruding portion is inserted in the yoke hole portion.

4. The rack shaft support device according to claim 3, wherein the cam protruding portion has a tool corresponding portion having a shape corresponding to a tool for rotating the intermediate cam component with respect to the plug.

5. The rack shaft support device according to claim 4, wherein the tool corresponding portion has a hexagon socket corresponding to a hexagonal wrench key.

6. The rack shaft support device according to claim 4, wherein the tool corresponding portion has a polygonal outer shape corresponding to a wrench.

7. A steering system comprising:
the rack housing;
the rack shaft;
the pinion shaft; and
the rack shaft support device according to claim 1.

* * * * *